United States Patent
Iwatsuki

(10) Patent No.: US 12,043,236 B2
(45) Date of Patent: Jul. 23, 2024

(54) CONTROLLER AND CONTROL METHOD

(71) Applicant: Robert Bosch GmbH, Stuttgart (DE)

(72) Inventor: Junya Iwatsuki, Kanagawa (JP)

(73) Assignee: Robert Bosch GmbH, Stuttgart (DE)

(*) Notice: Subject to any disclaimer, the term of this patent is extended or adjusted under 35 U.S.C. 154(b) by 287 days.

(21) Appl. No.: 17/311,817

(22) PCT Filed: Dec. 2, 2019

(86) PCT No.: PCT/IB2019/060365
§ 371 (c)(1),
(2) Date: Jun. 8, 2021

(87) PCT Pub. No.: WO2020/121111
PCT Pub. Date: Jun. 18, 2020

(65) Prior Publication Data
US 2022/0024429 A1    Jan. 27, 2022

(30) Foreign Application Priority Data

Dec. 10, 2018  (JP) ................................. 2018-230501

(51) Int. Cl.
*B60T 8/17*  (2006.01)
*B60T 8/1755*  (2006.01)

(52) U.S. Cl.
CPC ........ *B60T 8/1706* (2013.01); *B60T 8/17552* (2013.01); *B60T 2230/03* (2013.01); *B60T 2250/03* (2013.01)

(58) Field of Classification Search
CPC ............... B60T 8/1706; B60T 8/17552; B60T 2230/03; B60T 2250/03
See application file for complete search history.

(56) References Cited

U.S. PATENT DOCUMENTS

2015/0105938 A1* 4/2015 Seki ..................... B62K 11/04
701/1
2015/0314781 A1* 11/2015 Klews .................. B60W 10/18
701/99

(Continued)

FOREIGN PATENT DOCUMENTS

| EP | 2977281 A1 | 1/2016 |
|---|---|---|
| JP | 2016501156 A | 1/2016 |
| WO | 2017168692 A1 | 2/2019 |

OTHER PUBLICATIONS

International Search Report and Written Opinion for Application No. PCT/IB2019/060365 dated Feb. 26, 2020 (8 pages).

*Primary Examiner* — Tyler J Lee
(74) *Attorney, Agent, or Firm* — Michael Best & Friedrich LLP

(57) ABSTRACT

A controller and a control method capable of appropriately stabilizing behavior of a rear wheel of a straddle-type vehicle. In the controller and the control method, a slip amount of a wheel of a straddle-type vehicle is controlled to be equal to or smaller than an allowable slip amount. In the case where it is determined that behavior of a rear wheel of the straddle-type vehicle is in an unstable state on the basis of a slip angle of the straddle-type vehicle, stabilization control is executed to reduce the allowable slip amount of the rear wheel to be smaller than the allowable slip amount of the rear wheel at the time when it is determined that the behavior of the rear wheel is in the stable state.

11 Claims, 6 Drawing Sheets

(56) References Cited

U.S. PATENT DOCUMENTS

| | | | | |
|---|---|---|---|---|
| 2017/0101081 A1* | 4/2017 | Meier | ................... | B60T 8/1766 |
| 2018/0339699 A1* | 11/2018 | Matsuda | ............... | B60W 30/02 |
| 2019/0023264 A1* | 1/2019 | Mizutani | ............... | B60T 8/1755 |
| 2019/0135248 A1* | 5/2019 | Iizuka | ................... | B60T 8/1706 |

* cited by examiner

[FIG. 1]
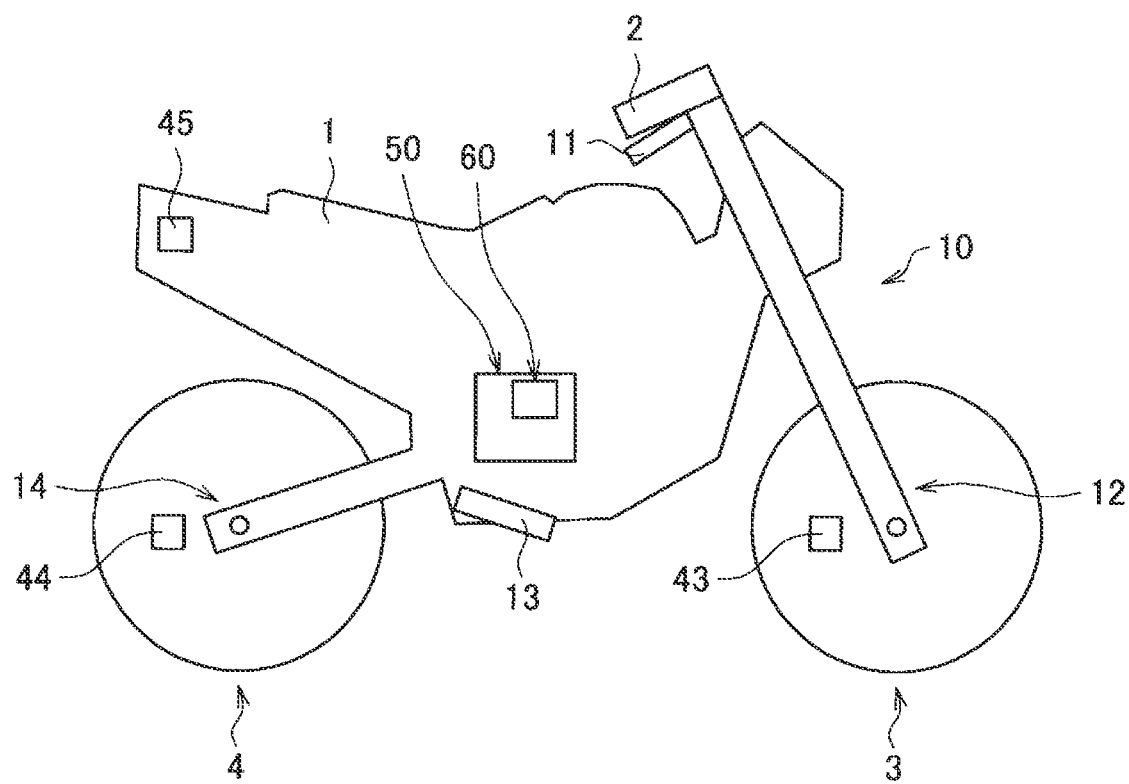

[FIG. 2]
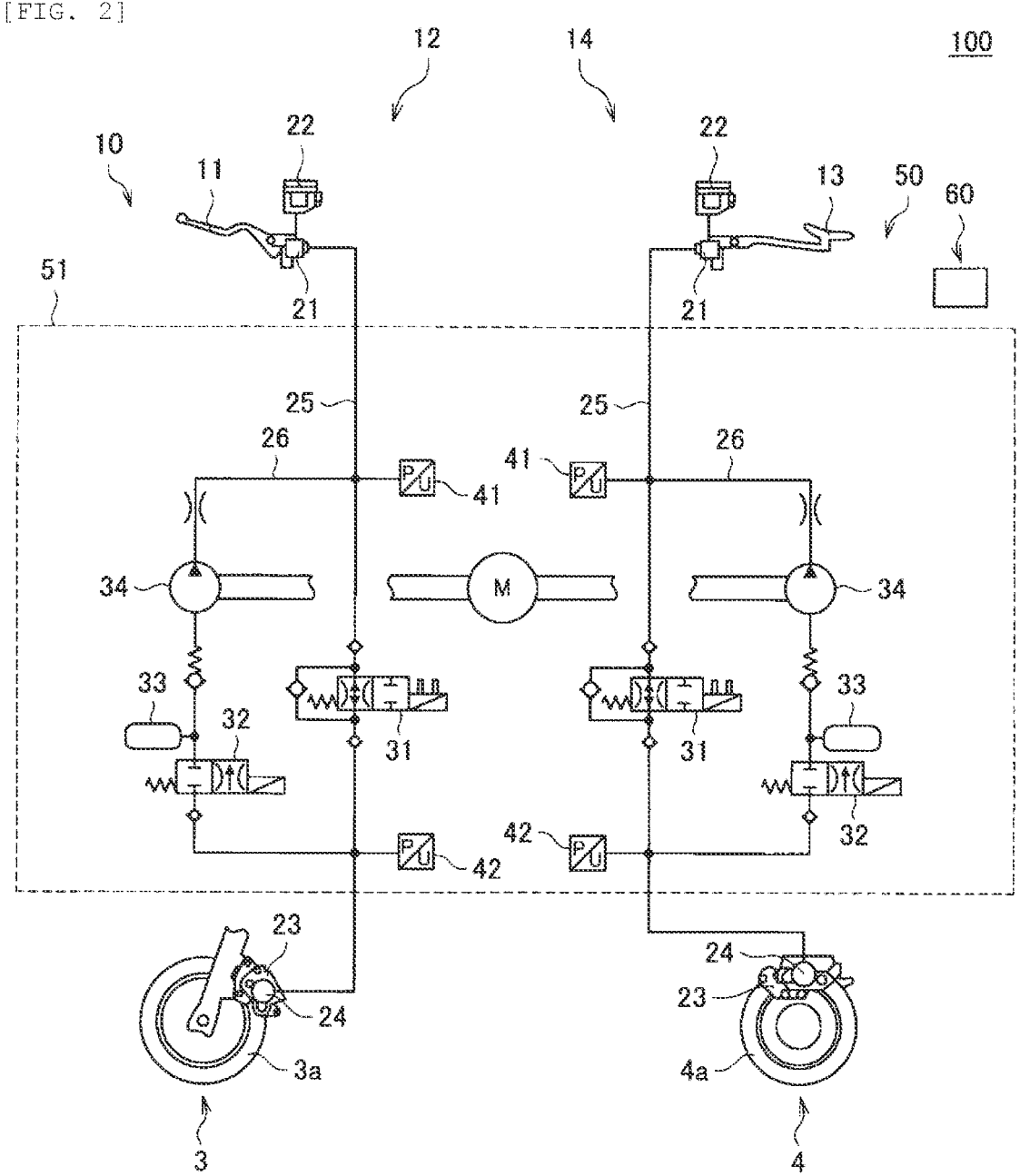

[FIG. 3]
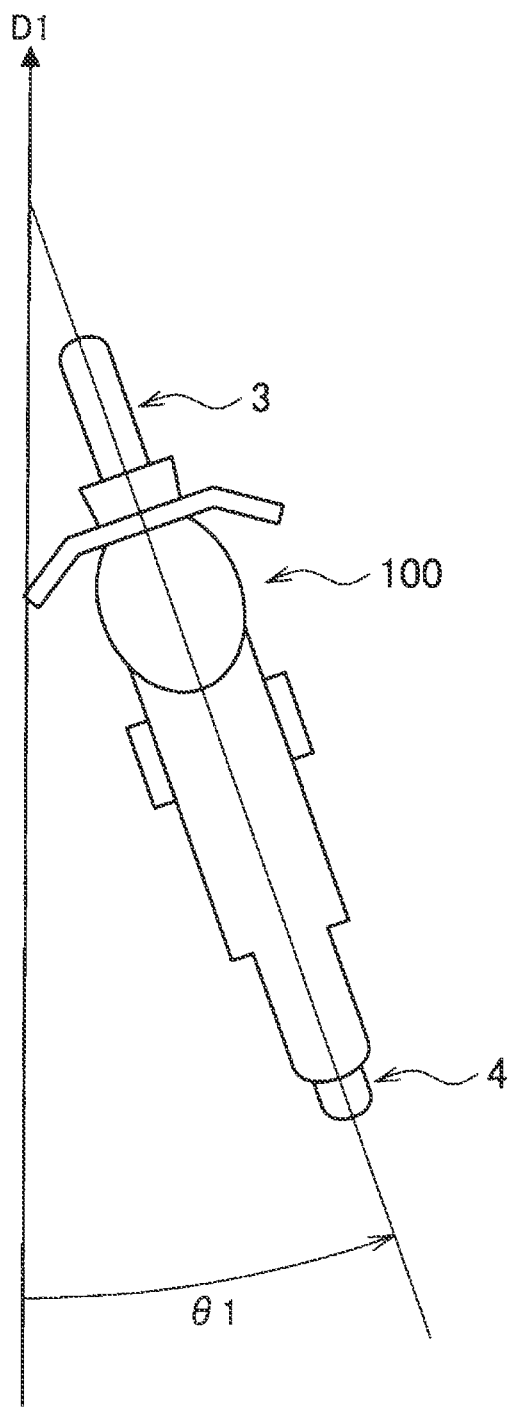

[FIG. 4]
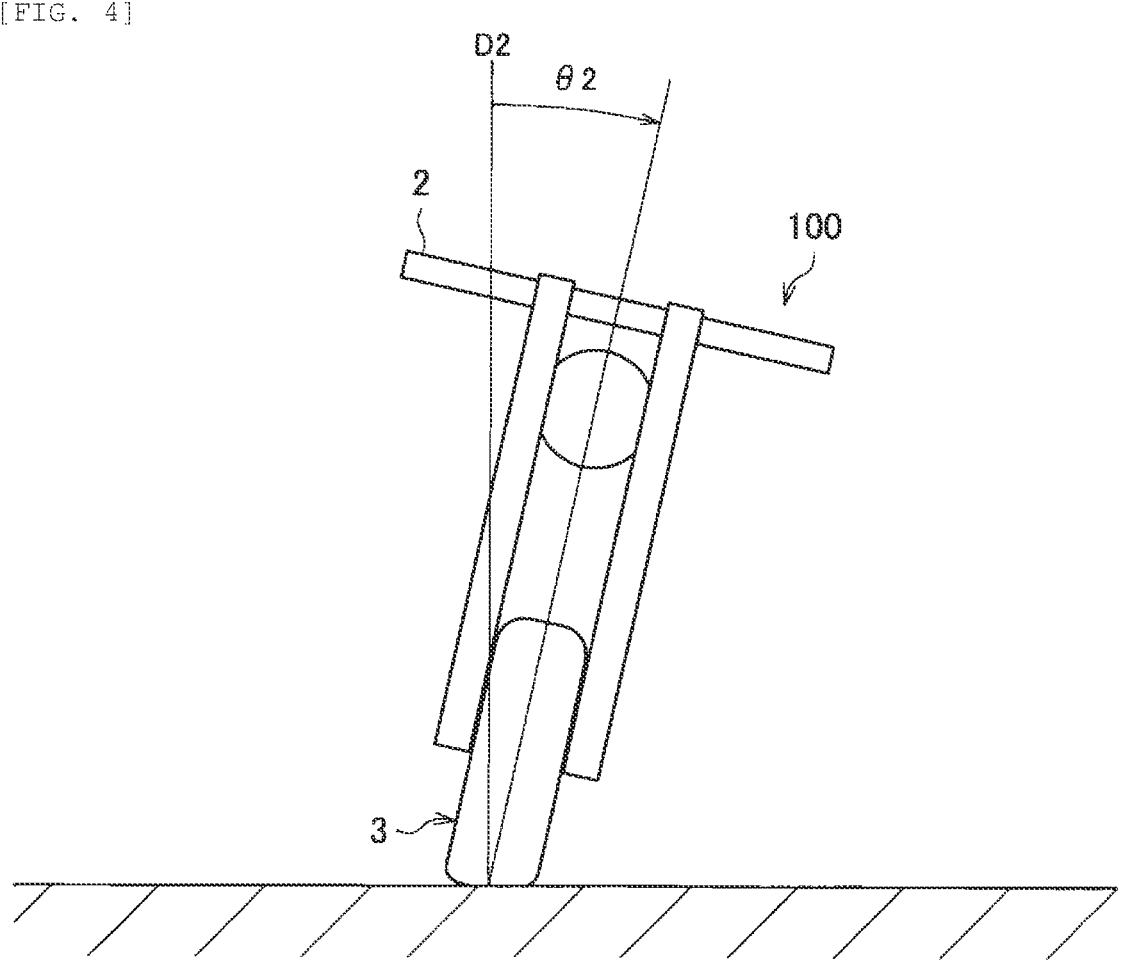

[FIG. 5]
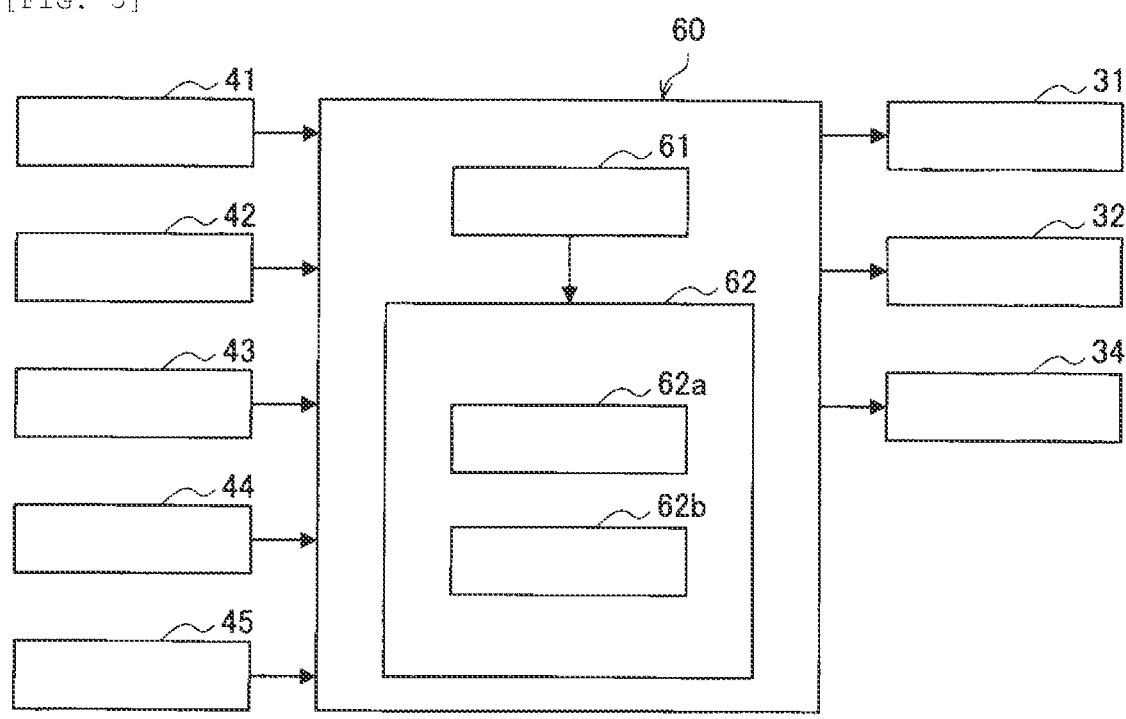

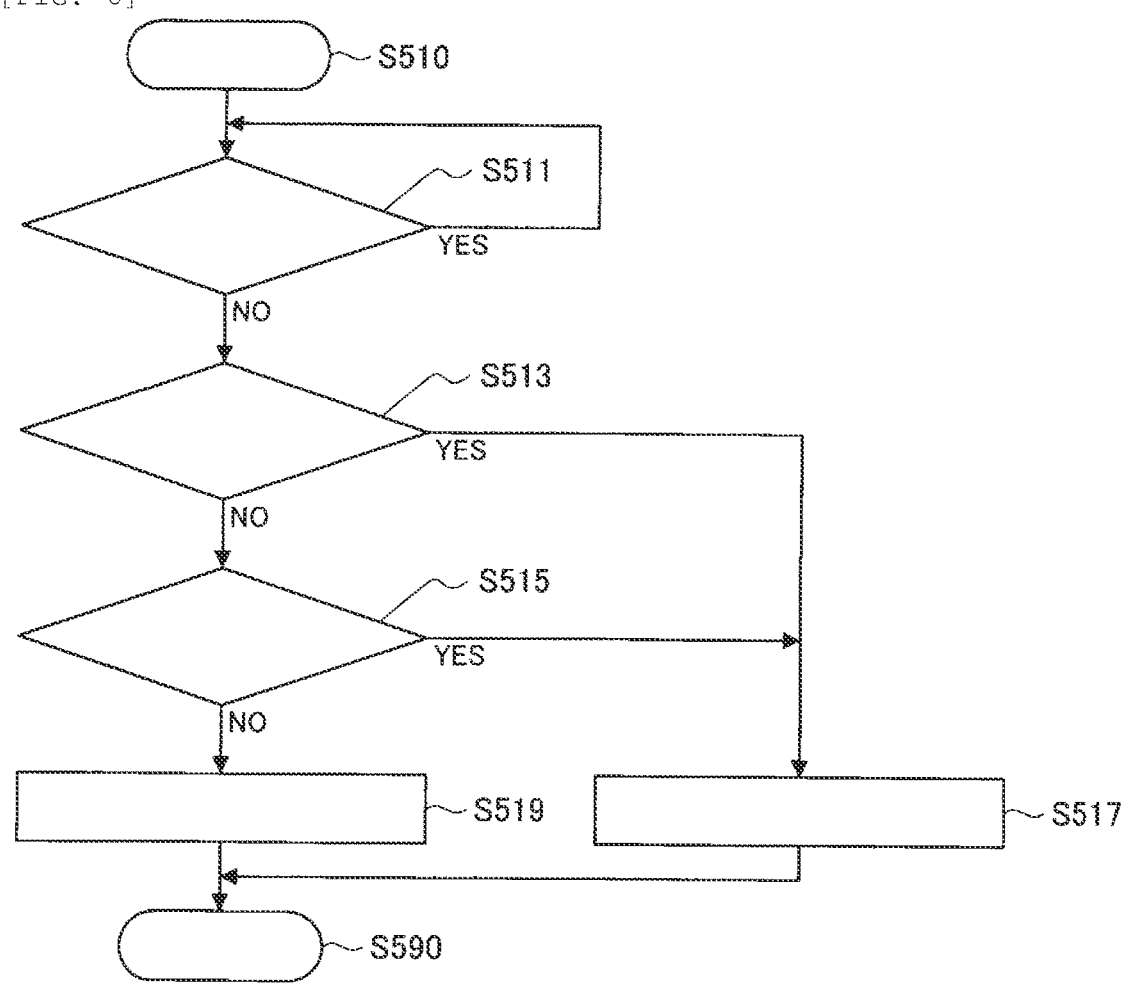

CONTROLLER AND CONTROL METHOD

BACKGROUND OF THE INVENTION

The present disclosure relates to a controller and a control method capable of appropriately stabilizing behavior of a rear wheel of a straddle-type vehicle.

Compared to other vehicles, behavior of a straddle-type vehicle such as a motorcycle tends to become unstable. Thus, it is important to stabilize the behavior of the straddle-type vehicle. For example, as a technique of stabilizing the behavior of the straddle-type vehicle, as disclosed in JP-A-2016-501156, a technique of stabilizing behavior of a rear wheel when the behavior of the rear wheel is brought into an unstable state such as a case where the rear wheel slips is available. More specifically, the case where the behavior of the rear wheel is in the unstable state corresponds to a case where the rear wheel excessively oscillates to the right and the left with respect to an advancing direction.

However, as described above, it is particularly important to stabilize the behavior of the straddle-type vehicle in comparison with the other vehicles. Thus, in addition to the related art such as the technique disclosed in JP-A-2016-501156, it has been desired to propose a technique of further appropriately stabilizing the behavior of the rear wheel of the straddle-type vehicle.

The present invention has been made with the above-described problem as the background and therefore obtains a controller and a control method capable of appropriately stabilizing behavior of a rear wheel of a straddle-type vehicle.

SUMMARY OF THE INVENTION

A controller according to the present invention is a controller that controls behavior of a straddle-type vehicle, and includes a control section that controls a slip amount of a wheel of the straddle-type vehicle to be equal to or smaller than an allowable slip amount. The control section determines whether behavior of a rear wheel of the straddle-type vehicle is in a stable state on the basis of a slip angle of the straddle-type vehicle and, when determining that the behavior of the rear wheel is in an unstable state, executes first stabilization control to reduce the allowable slip amount of the rear wheel to be smaller than the allowable slip amount of the rear wheel at the time of determining that the behavior of the rear wheel is in the stable state.

A control method according to the present invention is a control method for controlling behavior of a straddle-type vehicle. A slip amount of a wheel of the straddle-type vehicle is controlled to be equal to or smaller than an allowable slip amount. The control method includes: a step of determining whether behavior of a rear wheel of the straddle-type vehicle is in a stable state on the basis of a slip angle of the straddle-type vehicle; and a step of executing first stabilization control, in which the allowable slip amount of the rear wheel is reduced to be smaller than the allowable slip amount of the rear wheel at the time when it is determined that the behavior of the rear wheel is in the stable state, in the case where it is determined that the behavior of the rear wheel is in an unstable state.

In the controller and the control method according to the present invention, the slip amount of the wheel of the straddle-type vehicle is controlled to be equal to or smaller than the allowable slip amount. Then, in the case where it is determined that the behavior of the rear wheel is in the unstable state, the first stabilization control is executed to reduce the allowable slip amount of the rear wheel to be smaller than the allowable slip amount of the rear wheel at the time when it is determined that the behavior of the rear wheel is in the stable state. In this way, when the rear wheel slips, the slip amount of the rear wheel can be reduced. Thus, it is possible to appropriately cancel the slip state of the rear wheel. As a result, it is possible to appropriately suppress the rear wheel from excessively oscillating to the right and the left with respect to an advancing direction in conjunction with the slippage of the rear wheel. Therefore, it is possible to appropriately stabilize the behavior of the rear wheel of the straddle-type vehicle.

BRIEF DESCRIPTION OF DRAWINGS

FIG. 1 is a schematic view of a configuration of a motorcycle on which a controller according to an embodiment of the present invention is mounted.

FIG. 2 is a schematic view of a configuration of a brake system according to the embodiment of the present invention.

FIG. 3 is an explanatory view for explaining a slip angle.

FIG. 4 is an explanatory view for explaining a lean angle.

FIG. 5 is a block diagram of an exemplary functional configuration of the controller according to the embodiment of the present invention.

FIG. 6 is a flowchart of an example of a processing procedure that is executed by the controller according to the embodiment of the present invention.

DETAILED DESCRIPTION

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles.

A configuration, operation, and the like, which will be described below, merely constitute one example. The controller and a control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Motorcycle>

A description will be made on a configuration of a motorcycle 100 on which a controller 60 according to an embodiment of the present invention is mounted with reference to FIG. 1 to FIG. 5.

FIG. 1 is a schematic view of the configuration of the motorcycle 100 on which the controller 60 is mounted. FIG. 2 is a schematic view of a configuration of a brake system 10. FIG. 3 is an explanatory view for explaining a slip angle. FIG. 4 is an explanatory view for explaining a lean angle. FIG. 5 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; and the brake system 10. In this embodiment, the controller (ECU) 60 is provided in a hydraulic pressure control unit 50 of the brake system 10, which will be described later. The motorcycle 100 further includes: a master-cylinder pressure sensor 41, a wheel-cylinder pressure sensor 42, a front-wheel rotational frequency sensor 43, a rear-wheel rotational frequency sensor 44, and an inertial measurement unit (IMU) 45.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and each of the front-wheel brake mechanism 12 and the rear-wheel brake mechanism 14 is partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 that includes a piston (not illustrated); a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 flows into the wheel cylinder 24; and a secondary channel 26 through which the brake fluid in the wheel cylinder 24 is released.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side.

The inlet valve 31 is an electromagnetic valve that is opened in an unenergized state and closed in an energized state, for example. The outlet valve 32 is an electromagnetic valve that is closed in an unenergized state and opened in an energized state, for example.

The hydraulic pressure control unit 50 includes: components such as the inlet valves 31, the outlet valves 32, the accumulators 33, and the pumps 34 used to control a brake hydraulic pressure; a base body 51 in which those components are provided and channels constituting the primary channels 25 and the secondary channels 26 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, during a normal time (that is, when the braking force corresponding to a brake operation by the driver is generated on the wheel), the controller 60 opens the inlet valves 31 and closes the outlet valves 32. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The master-cylinder pressure sensor 41 detects a hydraulic pressure of the brake fluid in the master cylinder 21 and outputs a detection result. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24 and outputs a detection result. The wheel-cylinder pressure sensor 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The front-wheel rotational frequency sensor 43 is provided in the front wheel 3.

The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The rear-wheel rotational frequency sensor 44 is provided in the rear wheel 4.

The inertial measurement unit 45 includes a three-axis gyroscope sensor and a three-directional acceleration sensor, and detects a posture of the motorcycle 100. The inertial measurement unit 45 is provided in the trunk 1, for example.

More specifically, the inertial measurement unit 45 detects the slip angle of the motorcycle 100, and outputs a detection result. The inertial measurement unit 45 may detect another physical quantity that can substantially be converted to the slip angle of the motorcycle 100. The slip angle corresponds to an angle θ1 illustrated in FIG. 3 (that is, an angle that represents an inclination in a yaw direction of a vehicle body of the motorcycle 100 with respect to an advancing direction D1). More specifically, the advancing direction D1 of the motorcycle 100 and the posture of the motorcycle 100 can be calculated on the basis of a detection result of each sensor in the inertial measurement unit 45. Thus, the inertial measurement unit 45 can detect the slip angle of the motorcycle 100.

The inertial measurement unit 45 also detects the lean angle of the motorcycle 100, and outputs a detection result. The inertial measurement unit 45 may detect another physical quantity that can substantially be converted to the lean angle of the motorcycle 100. The lean angle corresponds to an angle θ2 illustrated in FIG. 4 (that is, an angle that represents an inclination in a rolling direction of the vehicle body of the motorcycle 100 with respect to an upper vertical direction D2).

In the motorcycle 100, instead of the inertial measurement unit 45, a device that only has a function of detecting the slip angle or a device that only has a function of detecting the lean angle may be used. Alternatively, in the motorcycle 100, a device other than the inertial measurement unit 45 may be used as the device that detects the slip angle. For example, as such a device, a device that captures an image in front of the motorcycle 100 and executes image processing of the captured image so as to be able to calculate the slip angle may be used.

The controller 60 controls behavior of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 5, the controller 60 includes an acquisition section 61 and the control section 62, for example.

The acquisition section 61 acquires information that is output from each of the devices mounted on the motorcycle 100, and outputs the acquired information to the control section 62. For example, the acquisition section 61 acquires the information output from the master-cylinder pressure sensor 41, the wheel-cylinder pressure sensor 42, the front-wheel rotational frequency sensor 43, the rear-wheel rotational frequency sensor 44, and the inertial measurement unit 45.

In order to control the behavior of the motorcycle 100, the control section 62 controls the braking force generated on the motorcycle 100. In particular, the control section 62 executes stabilization control for stabilizing behavior of the rear wheel 4 of the motorcycle 100.

In the present specification, the description will primarily be made on an example in which the stabilization control is realized by controlling the braking force generated on the motorcycle 100. However, the stabilization control may be realized by controlling drive power generated on the motorcycle 100.

The control section 62 includes a stable state determination section 62a and a brake control section 62b, for example.

The stable state determination section 62a determines whether the behavior of the rear wheel 4 of the motorcycle 100 is in the stable state on the basis of the slip angle of the motorcycle 100. More specifically, a case where the behavior of the rear wheel 4 is in an unstable state corresponds to a case where the rear wheel 4 excessively oscillates to the right and the left with respect to the advancing direction.

The brake control section 62b controls the operation of each of the components in the hydraulic pressure control unit 50 of the brake system 10, so as to control the braking force generated on the wheel of the motorcycle 100.

In the normal time, as described above, the brake control section 62b controls the operation of each of the components in the hydraulic pressure control unit 50 such that the braking force corresponding to the brake operation by the driver is generated on the wheel. Meanwhile, under a particular situation, the brake control section 62b executes control of regulating the braking force generated on the wheel from the braking force corresponding to the brake operation by the driver.

For example, the brake control section 62b brings the motorcycle 100 into a state where the inlet valve 31 is closed and the outlet valve 32 is opened, and drives the pump 34 in such a state. In this way, the brake control section 62b can reduce the hydraulic pressure of the brake fluid in the wheel cylinder 24 and can thereby reduce the braking force generated on the wheel. In addition, for example, the brake control section 62b closes both of the inlet valve 31 and the outlet valve 32 from the above state. In this way, the brake control section 62b can keep the hydraulic pressure of the brake fluid in the wheel cylinder 24 and can thereby keep the braking force generated on the wheel. Furthermore, for example, the brake control section 62b opens the inlet valve 31 and closes the outlet valve 32 from the above state. In this way, the brake control section 62b can increase the hydraulic pressure of the brake fluid in the wheel cylinder 24 and can thereby increase the braking force generated on the wheel. The brake control section 62b can separately control the braking force generated on the front wheel 3 and the braking force generated on the rear wheel 4 by separately controlling the operation of the front-wheel brake mechanism 12 and the rear-wheel brake mechanism 14.

More specifically, in the case where a slip amount of the wheel exceeds an allowable slip amount during deceleration of the motorcycle 100, the brake control section 62b reduces the braking force to be generated on the wheel. In this way, the brake control section 62b controls the slip amount of the wheel of the motorcycle 100 to be equal to or smaller than the allowable slip amount. This control is control that is referred to as anti-lock brake control for regulating the braking force to be generated on the wheel in order to suppress locking of the wheel.

In detail, the brake control section 62b calculates a vehicle speed of the motorcycle 100 on the basis of the rotational frequencies of the front wheel 3 and the rear wheel 4 and calculates the slip amount of each of the wheels on the basis of a comparison result between the rotational frequency of each of the wheels and the vehicle speed. The slip amount is an index indicating a degree of slippage of the wheel on a road surface. For example, a slip rate that is acquired by dividing a difference between the vehicle speed and the rotational frequency of the wheel by the vehicle speed is used as the slip amount. Then, in the case where there is the wheel, the slip amount of which exceeds the allowable slip amount, the brake control section 62b determines that the wheel is locked or possibly locked, and reduces the braking force generated on the wheel. In this way, it is possible to reduce the slip amount of the wheel to be equal to or smaller than the allowable slip amount. The allowable slip amount is a value that is set such that it is possible to appropriately determine whether the wheel is locked or possibly locked, and can appropriately be set according to a specification of the vehicle.

In addition, in the case where the deceleration exceeds allowable deceleration during the deceleration of the motorcycle 100, the brake control section 62b reduces the braking force generated on each of the wheels. In this way, the brake control section 62b controls the deceleration of the motorcycle 100 to be equal to or lower than the allowable deceleration. This control is control for suppressing rapid braking with which the excess deceleration is generated on the motorcycle 100.

In detail, the brake control section 62b calculates the vehicle speed of the motorcycle 100 on the basis of the rotational frequencies of the front wheel 3 and the rear wheel 4 and calculates the deceleration of the motorcycle 100 on the basis of a transition of the vehicle speed. Then, in the case where the deceleration exceeds the allowable deceleration, the brake control section 62b determines that the excess deceleration is generated on the motorcycle 100, and reduces the braking force generated on each of the wheels. In this way, the deceleration can be reduced to be equal to or lower than the allowable deceleration. The allowable deceleration is a value that is set such that it is possible to appropriately determine whether the excess deceleration is generated on the motorcycle 100, and can appropriately be set according to the specification of the vehicle.

As described above, in the controller 60, the control section 62 controls the slip amount of the wheel of the motorcycle 100 to be equal to or smaller than the allowable slip amount. Here, when determining that the behavior of the rear wheel 4 is in the unstable state, the control section 62 executes first stabilization control to reduce the allowable slip amount of the rear wheel 4 to be smaller than the allowable slip amount of the rear wheel 4 at the time of determining that the behavior of the rear wheel 4 is in the stable state. In this way, the behavior of the rear wheel 4 of the motorcycle 100 can appropriately be stabilized. Processing for such stabilization control, which is executed by the controller 60, will be described later in detail.

<Operation of Controller>

A description will be made on operation of the controller 60 according to the embodiment of the present invention with reference to FIG. 6.

FIG. 6 is a flowchart of an exemplary processing procedure that is executed by the controller 60. More specifically, the control flow illustrated in FIG. 6 corresponds to a processing procedure related to the stabilization control, which is realized by the control of the braking force executed by the control section 62 of the controller 60, and is initiated when the rear wheel 4 is in the stable state during the deceleration of the motorcycle 100. In addition, step S510 and step S590 in FIG. 6 respectively correspond to the initiation and termination of the control flow illustrated in FIG. 6.

When the control flow illustrated in FIG. 6 is initiated, in step S511, the stable state determination section 62a of the control section 62 determines whether the behavior of the rear wheel 4 is in the stable state. If it is determined that the behavior of the rear wheel 4 is in the stable state (step S511/YES), the determination processing in step S511 is repeated. On the other hand, if it is determined that the behavior of the rear wheel 4 is in the unstable state (step S511/NO), the processing proceeds to step S513.

In step S511, as described above, the stable state determination section 62a determines whether the behavior of the rear wheel 4 is in the stable state on the basis of the slip angle of the motorcycle 100.

As described above, the case where the behavior of the rear wheel 4 is in the unstable state is the case where the rear wheel 4 excessively oscillates to the right and the left with respect to the advancing direction, and includes a case where oscillation of the rear wheel 4 in a right-left direction is excessively large and a case where an oscillating speed of the rear wheel 4 in the right-left direction is excessively high.

For example, in the case where an absolute value of the slip angle is larger than an absolute value threshold, the stable state determination section 62a determines that the behavior of the rear wheel 4 is in the unstable state. The absolute value threshold is set to a value with which it is possible to appropriately determine whether the oscillation of the rear wheel 4 in the right-left direction is excessively large.

Here, if it is determined that the behavior of the rear wheel 4 is in the unstable state (that is, if it is determined NO in step S511), as will be described later, the stabilization control (more specifically, the first stabilization control or second stabilization control) is executed. Thus, as the absolute value threshold is reduced, the stabilization control can be more likely to be executed. From a perspective of executing the stabilization control at appropriate timing, the stable state determination section 62a preferably reduces the absolute value threshold as the vehicle speed of the motorcycle 100 is increased. From the similar perspective, the stable state determination section 62a preferably reduces the absolute value threshold as the lean angle of the motorcycle 100 is increased.

In addition, for example, in the case where a change speed (that is, a change amount per unit time) of the slip angle is higher than a change speed threshold, the stable state determination section 62a determines that the behavior of the rear wheel 4 is in the unstable state. The change speed threshold is set to a value with which it is possible to appropriately determine whether the oscillating speed of the rear wheel 4 in the right-left direction is excessively high.

Here, as the change speed threshold is reduced, the stabilization control can be more likely to be executed. From the perspective of executing the stabilization control at the appropriate timing, the stable state determination section 62a preferably reduces the change speed threshold as the vehicle speed of the motorcycle 100 is increased. From the similar perspective, the stable state determination section 62a preferably reduces the change speed threshold as the lean angle of the motorcycle 100 is increased.

If it is determined NO in step S511, in step S513, the control section 62 determines whether the lean angle of the motorcycle 100 is larger than a lean angle threshold. If it is determined that the lean angle is larger than the lean angle threshold (step S513/YES), the processing proceeds to step S517, and the first stabilization control is executed. On the other hand, if it is determined that the lean angle is equal to or smaller than the lean angle threshold (step S513/NO), the processing proceeds to step S515.

The lean angle threshold is set to a value with which it is possible to appropriately determine whether the motorcycle 100 is traveling on a curved road (that is, cornering).

If it is determined NO in step S513, in step S515, the control section 62 determines whether the deceleration of the motorcycle 100 is equal to or lower than a deceleration threshold. If it is determined that the deceleration is equal to or lower than the deceleration threshold (step S515/YES), the processing proceeds to step S517, and the first stabilization control is executed. On the other hand, if it is determined that the deceleration is higher than the deceleration threshold (step S515/NO), the processing proceeds to step S519, and the second stabilization control is executed.

The deceleration threshold is set to a value with which it is possible to appropriately determine whether the rapid braking, with which the excess deceleration is generated on the motorcycle 100, is currently performed.

If it is determined YES in step S513 or step S515, in step S517, the brake control section 62*b* of the control section 62 executes the first stabilization control. The first stabilization control is the stabilization control that reduces the allowable slip amount of the rear wheel 4 to be smaller than the allowable slip amount of the rear wheel 4 at the time when it is determined that the behavior of the rear wheel 4 is in the stable state.

Here, an example of a situation where the behavior of the rear wheel 4 is brought into the unstable state is a situation where the rear wheel 4 slips, and the first stabilization control is executed under such a situation. More specifically, as described above, the first stabilization control is executed If it is determined YES in step S513 or step S515. Here, if it is determined YES in step S513, it is considered that the rear wheel 4 is likely to slip due to a fact that the motorcycle 100 is cornering. Meanwhile, if it is determined YES in step S515, in a state where the deceleration is relatively low during travel of the motorcycle 100 on a straight road, the behavior of the rear wheel 4 is in the unstable state. Accordingly, it is considered that there is a high possibility that the rear wheel 4 slips during the travel on a low μ road with a relatively small friction coefficient.

As described above, the first stabilization control is executed under the situation where the behavior of the rear wheel 4 is in the unstable state due to the slippage of the rear wheel 4. Here, in the case where the behavior of the rear wheel 4 is brought into the unstable state due to the slippage of the rear wheel 4, the oscillation of the rear wheel 4 in the right-left direction tends to become relatively small, and the oscillating speed of the rear wheel 4 in the right-left direction tends to become relatively high.

More specifically, in the first stabilization control, the brake control section 62*b* reduces the allowable slip amount of the rear wheel 4 and also reduces the braking force generated on the rear wheel 4. In this way, the brake control section 62*b* controls the slip amount of the rear wheel 4 to be equal to or smaller than the reduced allowable slip amount. In this way, in the case where the rear wheel 4 slips, it is possible to appropriately cancel the slip state of the rear wheel 4. Thus, it is possible to appropriately suppress the rear wheel 4 from excessively oscillating to the right and the left with respect to the advancing direction in conjunction with the slippage of the rear wheel 4. Therefore, it is possible to appropriately stabilize the behavior of the rear wheel 4 of the motorcycle 100.

If it is determined NO in both of step S513 and step S515, in step S519, the brake control section 62*b* of the control section 62 executes the second stabilization control. The second stabilization control is the stabilization control that reduces the allowable deceleration of the motorcycle 100 to be lower than the allowable deceleration at the time when it is determined that the behavior of the rear wheel 4 is in the stable state.

Here, an example of the situation where the behavior of the rear wheel 4 is brought into the unstable state is a situation where the center of gravity of the motorcycle 100 moves forward due to the rapid braking and a force that presses the rear wheel 4 against the ground becomes excessively small. The second stabilization control is executed under such a situation. More specifically, as described above, the second stabilization control is executed If it is determined NO in both of step S513 and step S515. Here, if it is determined NO in both of step S513 and step S515, in a state where the deceleration is relatively high during the travel of the motorcycle 100 on the straight road, the behavior of the rear wheel 4 is in the unstable state. Accordingly, it is considered that there is a high possibility that the rapid braking is performed during the travel on a high μ road with the relatively high friction coefficient.

As described above, the second stabilization control is executed under the situation where the behavior of the rear wheel 4 is in the unstable state due to the rapid braking. Here, in the case where the behavior of the rear wheel 4 is brought into the unstable state due to the rapid braking, the oscillation of the rear wheel 4 in the right-left direction tends to become relatively large, and the oscillating speed of the rear wheel 4 in the right-left direction tends to become relatively low.

More specifically, in the second stabilization control, the brake control section 62*b* reduces the allowable deceleration and also reduces the braking force generated on each of the wheels. In this way, the brake control section 62*b* controls the deceleration of the motorcycle 100 to be equal to or lower than the reduced allowable deceleration. In this way, in the case where the rapid braking is performed, it is possible to appropriately cancel a state where the excessively large braking force is generated on the front wheel 3. Thus, it is possible to appropriately suppress shortage of the force that presses the rear wheel 4 against the ground, which is caused by the movement of the center of gravity of the motorcycle 100 to the front. Therefore, it is possible to appropriately stabilize the behavior of the rear wheel 4 of the motorcycle 100.

After step S517 or step S519, the control flow illustrated in FIG. 6 is terminated.

As described above, in the control flow illustrated in FIG. 6, when determining that the behavior of the rear wheel 4 is in the unstable state during the deceleration of the motorcycle 100, the control section 62 switches between the first stabilization control and the second stabilization control for the execution. In this way, it is possible to appropriately stabilize the behavior of the rear wheel 4 according to the situation where the behavior of the rear wheel 4 is brought into the unstable state. Here, from a perspective of further appropriately stabilizing the behavior of the rear wheel 4 according to the situation where the behavior of the rear wheel 4 is brought into the unstable state, as in the control flow illustrated in FIG. 6, the control section 62 further preferably switches between the first stabilization control and the second stabilization control according to the deceleration of the motorcycle 100. From the similar perspective, as in the control flow illustrated in FIG. 6, the control section 62 further preferably switches between the first stabilization control and the second stabilization control according to the lean angle of the motorcycle 100.

The above description has primarily been made on the example in which the control section 62 executes the stabilization control by controlling the braking force generated on the motorcycle 100 with reference to the control flow illustrated in FIG. 6. However, as described above, the control section 62 may execute the stabilization control by controlling the drive power generated on the motorcycle 100.

For example, the control section 62 controls the drive power generated on the motorcycle 100 by controlling operation of a power source (for example, an engine or a driving motor) of the motorcycle 100. In this case, in the case where the slip amount of the wheel exceeds the allowable slip amount during acceleration of the motorcycle 100, the control section 62 reduces the drive power generated on the wheel. In this way, the control section 62 can control the slip amount of the wheel of the motorcycle 100 to be equal to or smaller than the allowable slip amount.

Here, there is a case where the behavior of the rear wheel 4 is brought into the unstable state due to slippage of the rear wheel 4 during the acceleration of the motorcycle 100. In such a case, the control section 62 determines that the behavior of the rear wheel 4 is in the unstable state, reduces the allowable slip amount of the rear wheel 4, and reduces the drive power generated on the rear wheel 4. In this way, the control section 62 can control the slip amount of the rear wheel 4 to be equal to or smaller than the reduced allowable slip amount. As described above, when determining that the behavior of the rear wheel 4 is in the unstable state during the acceleration of the motorcycle 100, the control section 62 executes the first stabilization control by controlling the drive power generated on the motorcycle 100. In this way, it is also possible to appropriately stabilize the behavior of the rear wheel 4 of the motorcycle 100 during the acceleration of the motorcycle 100.

<Effects of Controller>

A description will be made on effects of the controller 60 according to the embodiment of the present invention.

The controller 60 includes the control section 62 that controls the slip amount of the wheel of the motorcycle 100 to be equal to or smaller than the allowable slip amount. The control section 62 determines whether the behavior of the rear wheel 4 of the motorcycle 100 is in the stable state on the basis of the slip angle of the motorcycle 100. Then, when determining that the behavior of the rear wheel 4 is in the unstable state, the control section 62 executes the first stabilization control to reduce the allowable slip amount of the rear wheel 4 to be smaller than the allowable slip amount of the rear wheel 4 at the time of determining that the behavior of the rear wheel 4 is in the stable state. In this way, in the case where the rear wheel 4 slips, it is possible to appropriately cancel the slip state of the rear wheel 4. Thus, it is possible to appropriately suppress the rear wheel 4 from excessively oscillating to the right and the left with respect to the advancing direction in conjunction with the slippage of the rear wheel 4. Therefore, it is possible to appropriately stabilize the behavior of the rear wheel 4 of the motorcycle 100.

Preferably, in the controller 60, in the case where the absolute value of the slip angle is larger than the absolute value threshold, the control section 62 determines that the behavior of the rear wheel 4 is in the unstable state. In this way, it is possible to appropriately detect the unstable state of the behavior of the rear wheel 4 where the oscillation of the rear wheel 4 in the right-left direction is excessively large. For example, it is possible to appropriately detect the unstable state of the behavior of the rear wheel 4 in the case where the behavior of the rear wheel 4 is in brought into the unstable state due to the rapid braking.

Preferably, in the controller 60, the control section 62 reduces the absolute value threshold as the vehicle speed of the motorcycle 100 is increased. Here, in the case where the vehicle speed of the motorcycle 100 is high, difficulty of appropriately canceling the slip state of the rear wheel 4 is increased when compared to the case where the vehicle speed is low. Thus, necessity of executing the stabilization control is increased. In addition, as the absolute value threshold is reduced, the stabilization control can be more likely to be executed. Thus, by reducing the absolute value threshold as the vehicle speed of the motorcycle 100 is increased, the stabilization control can be more likely to be executed as the necessity of executing the stabilization control is increased. Therefore, it is possible to execute the stabilization control at the appropriate timing.

Preferably, in the controller 60, the control section 62 reduces the absolute value threshold as the lean angle of the motorcycle 100 is increased. Here, as the lean angle of the motorcycle 100 is increased, the posture of the motorcycle 100 is more likely to become unstable. Thus, the necessity of executing the stabilization control is increased. In addition, as the absolute value threshold is reduced, the stabilization control can be more likely to be executed. Accordingly, by reducing the absolute value threshold as the lean angle of the motorcycle 100 is increased, the stabilization control can be more likely to be executed as the necessity of executing the stabilization control is increased. Therefore, it is possible to execute the stabilization control at the appropriate timing.

Preferably, in the controller 60, in the case where the change speed of the slip angle is higher than the change speed threshold, the control section 62 determines that the behavior of the rear wheel 4 is in the unstable state. In this way, it is possible to appropriately detect the unstable state of the behavior of the rear wheel 4 where the oscillating speed of the rear wheel 4 in the right-left direction is excessively high. For example, it is possible to appropriately detect the unstable state of the behavior of the rear wheel 4 in the case where the behavior of the rear wheel 4 is in brought into the unstable state due to the slippage of the rear wheel 4.

Preferably, in the controller 60, the control section 62 reduces the change speed threshold as the vehicle speed of the motorcycle 100 is increased. Here, in the case where the vehicle speed of the motorcycle 100 is high, the difficulty of appropriately canceling the slip state of the rear wheel 4 is increased when compared to the case where the vehicle speed is low. Thus, the necessity of executing the stabilization control is increased. In addition, as the change speed threshold is reduced, the stabilization control can be more likely to be executed. Thus, by reducing the change speed threshold as the vehicle speed of the motorcycle 100 is increased, the stabilization control can be more likely to be executed as the necessity of executing the stabilization control is increased. Therefore, it is possible to execute the stabilization control at the appropriate timing.

Preferably, in the controller 60, the control section 62 reduces the change speed threshold as the lean angle of the motorcycle 100 is increased. Here, as the lean angle of the motorcycle 100 is increased, the posture of the motorcycle 100 is more likely to become unstable. Thus, the necessity of executing the stabilization control is increased. In addition, as the change speed threshold is reduced, the stabilization control can be more likely to be executed. Thus, by reducing the change speed threshold as the lean angle of the motorcycle 100 is increased, the stabilization control can be more likely to be executed as the necessity of executing the stabilization control is increased. Therefore, it is possible to execute the stabilization control at the appropriate timing.

Preferably, in the controller 60, the control section 62 controls the deceleration of the motorcycle 100 to be equal to or lower than the allowable deceleration. Then, when determining that the behavior of the rear wheel 4 is in the unstable state during the deceleration of the motorcycle 100, the control section 62 switches between the first stabilization control and the second stabilization control, in which the allowable deceleration is reduced to be lower than the allowable deceleration at the time of determining that the behavior of the rear wheel 4 is in the stable state, for the execution. According to such second stabilization control, in the case where the rapid braking is performed, it is possible to appropriately cancel the state where the excessively large braking force is generated on the front wheel 3. Thus, it is possible to appropriately suppress shortage of the force that presses the rear wheel 4 against the ground, which is caused by the movement of the center of gravity of the motorcycle 100 to the front. Therefore, by switching between the first stabilization control and the second stabilization control for the execution, it is possible to appropriately stabilize the behavior of the rear wheel 4 according to the situation where the behavior of the rear wheel 4 is brought into the unstable state (that is, according to whether the behavior of the rear wheel 4 is in the unstable state due to the slippage of the rear wheel 4 or whether the behavior of the rear wheel 4 is in the unstable state due to the rapid braking).

Preferably, in the controller 60, when determining that the behavior of the rear wheel 4 is in the unstable state during the deceleration of the motorcycle 100, the control section 62 switches between the first stabilization control and the second stabilization control according to the deceleration of the motorcycle 100. Here, in the state where the deceleration is relatively low during the travel of the motorcycle 100 on the straight road, in the case where the behavior of the rear wheel 4 is in the unstable state, it is considered that there is the high possibility that the rear wheel 4 slips during the travel on the low μ road with the relatively small friction coefficient. Here, in the state where the deceleration is relatively high during the travel of the motorcycle 100 on the straight road, in the case where the behavior of the rear wheel 4 is in the unstable state, it is considered that there is the high possibility that the rapid braking is performed during the travel on the low μ road with the relatively large friction coefficient. Thus, by switching between the first stabilization control and the second stabilization control according to the deceleration of the motorcycle 100, it is possible to further appropriately stabilize the behavior of the rear wheel 4 according to the situation where the behavior of the rear wheel 4 is brought into the unstable state.

Preferably, in the controller 60, when determining that the behavior of the rear wheel 4 is in the unstable state during the deceleration of the motorcycle 100, the control section 62 switches between the first stabilization control and the second stabilization control according to the lean angle of the motorcycle 100. Here, in the case where the motorcycle 100 is cornering, it is considered that the rear wheel 4 is likely to slip. Thus, in the case where the lean angle is large to such an extent that it can be determined that the motorcycle 100 is cornering, the first stabilization control is executed. In this way, it is possible to appropriately stabilize the behavior of the rear wheel 4 of the motorcycle 100 under the situation where the behavior of the rear wheel 4 is in the unstable state due to the slippage of the rear wheel 4. Therefore, by switching between the first stabilization control and the second stabilization control according to the lean angle of the motorcycle 100, it is possible to further appropriately stabilize the behavior of the rear wheel 4 according to the situation where the behavior of the rear wheel 4 is brought into the unstable state.

Here, as a method for suppressing the behavior of the rear wheel 4 from being brought into the unstable state, a method for setting an upper limit value of the braking force or the drive power generated on the motorcycle 100 to such a small value in advance that the behavior of the rear wheel 4 is not brought into the unstable state regardless of the travel state of the vehicle (that is, regardless of whether the behavior of the rear wheel 4 is the unstable state) is considered. However, in the case where such a method is used, braking performance or drive performance of the motorcycle 100 is excessively limited. Meanwhile, according to the controller 60, as described above, in the case where it is determined that the behavior of the rear wheel 4 is in the unstable state, the stabilization control is executed. Thus, it is possible to appropriately stabilize the behavior of the rear wheel 4 of the motorcycle 100 while suppressing the braking performance or the drive performance of the motorcycle 100 from becoming excessively limited.

The present invention is not limited to each of the embodiments that have been described. For example, all or parts of the embodiments may be combined, or only a part of each of the embodiments may be implemented.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Master-cylinder pressure sensor
42: Wheel-cylinder pressure sensor
43: Front-wheel rotational frequency sensor
44: Rear-wheel rotational frequency sensor
45: Inertial measurement unit (IMU)
50: Hydraulic pressure control unit
51: Base body
60: Controller
61: Acquisition section
62: Control section
62a: Stable state determination section
62b: Brake control section
100: Motorcycle

The invention claimed is:

1. A controller (60) that controls behavior of a straddle-type vehicle (100), the controller configured to:
control a slip amount of a rear wheel (4) of the straddle-type vehicle (100) to be equal to or smaller than an allowable slip amount, wherein the controller determines whether behavior of the rear wheel (4) of the straddle-type vehicle (100) is in a stable state or is in an unstable state based on a slip angle of the straddle-type vehicle (100) and when determining that the behavior of the rear wheel (4) is in the unstable state based on the slip angle of the straddle-type vehicle (100), determines whether a lean angle of the straddle-type vehicle (100) is larger than a lean angle threshold, the lean angle threshold being a value indicative whether the straddle-type vehicle is traveling on a curved road, and when it is determined that the lean angle is larger than the lean angle threshold, executes first stabilization control to reduce the allowable slip amount of the rear wheel (4) to be smaller than the allowable slip amount of the rear wheel (4) at the time of determining that the behavior of the rear wheel (4) is in the stable state.

2. The controller according to claim 1, wherein
in the case where an absolute value of the slip angle is larger than an absolute value threshold, the controller determines that the behavior of the rear wheel (4) is in the unstable state.

3. The controller according to claim 2, wherein
the controller reduces the absolute value threshold as a vehicle speed of the straddle-type vehicle (100) is increased.

4. The controller according to claim 2, wherein
the controller reduces the absolute value threshold as the lean angle of the straddle-type vehicle (100) is increased.

5. The controller according to claim 1, wherein
in the case where a change speed of the slip angle is higher than a change speed threshold, the controller determines that the behavior of the rear wheel (4) is in the unstable state.

6. The controller according to claim 5, wherein
the controller reduces the change speed threshold as a vehicle speed of the straddle-type vehicle (100) is increased.

7. The controller according to claim 5, wherein
the controller reduces the change speed threshold as the lean angle of the straddle-type vehicle (100) is increased.

8. The controller according to claim 1, wherein
the controller controls deceleration of the straddle-type vehicle (100) to be equal to or lower than allowable deceleration, and when determining that the behavior of the rear wheel (4) is in the unstable state during the deceleration of the straddle-type vehicle (100), switches between the first stabilization control and a second stabilization control, in which the allowable deceleration is reduced to be lower than the allowable deceleration at the time of determining that the behavior of the rear wheel (4) is in the stable state, for execution.

9. The controller according to claim 8, wherein
when determining that the behavior of the rear wheel (4) is in the unstable state during the deceleration of the straddle-type vehicle (100), the controller switches between the first stabilization control and the second stabilization control according to the deceleration of the straddle-type vehicle (100).

10. The controller according to claim 8, wherein the controller switches between the first stabilization control and the second stabilization control according to the lean angle of the straddle-type vehicle (100) when determining that the behavior of the rear wheel (4) is in the unstable state during the deceleration of the straddle-type vehicle (100).

11. A control method for controlling behavior of a straddle-type vehicle (100), a slip amount of a rear wheel (4) of the straddle-type vehicle (100) being controlled to be equal to or smaller than an allowable slip amount, the control method comprising:
a step (S511) of determining whether behavior of the rear wheel (4) of the straddle-type vehicle (100) is in a stable state or is in an unstable state based on a slip angle of the straddle-type vehicle (100);
a step (S513) of determining whether a lean angle of the straddle-type vehicle (100) is larger than a lean angle threshold, the lean angle threshold being a value indicative whether the straddle-type vehicle is traveling on a curved road, in the case where the rear wheel (4) is determined to be in the unstable state based on a slip angle of the straddle-type vehicle (100); and
a step (S517) of executing first stabilization control, in which the allowable slip amount of the rear wheel (4) is reduced to be smaller than the allowable slip amount of the rear wheel (4) at the time when it is determined that the behavior of the rear wheel (4) is in the stable state, in the case where it is determined that the lean angle is larger than the lean angle threshold.

\* \* \* \* \*